Figure 1:
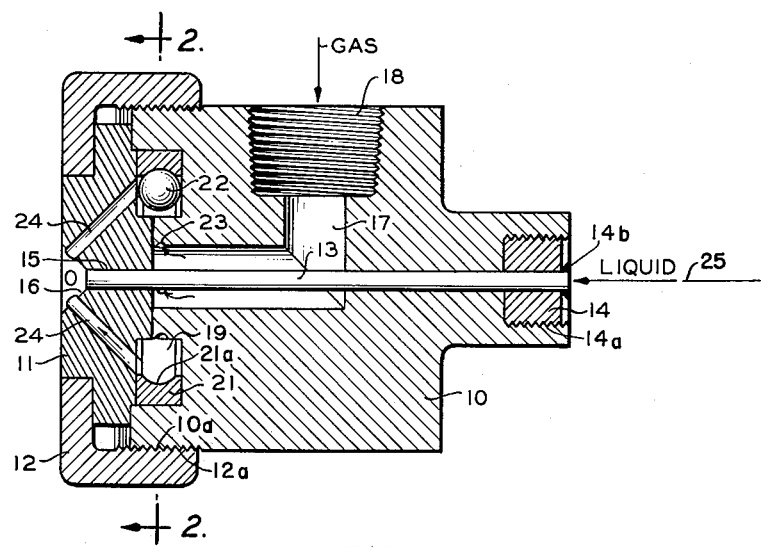
Figure 2:
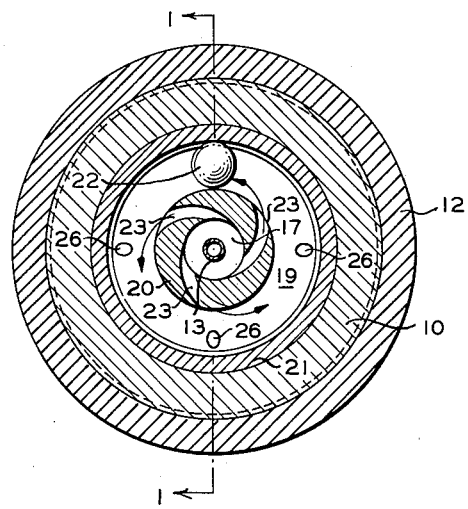

Oct. 17, 1961 W. C. POUPPIRT, JR 3,004,719
APPARATUS FOR SPRAYING VISCOUS LIQUIDS
Filed Sept. 26, 1957 2 Sheets-Sheet 1

INVENTOR.
W. C. POUPPIRT, JR.
BY *Hudson & Young*
ATTORNEYS

Oct. 17, 1961 W. C. POUPPIRT, JR 3,004,719
APPARATUS FOR SPRAYING VISCOUS LIQUIDS
Filed Sept. 26, 1957 2 Sheets-Sheet 2

INVENTOR.
W. C. POUPPIRT, JR.
BY *Hudson & Young*
ATTORNEYS

United States Patent Office 3,004,719
Patented Oct. 17, 1961

3,004,719
APPARATUS FOR SPRAYING VISCOUS LIQUIDS
Walter C. Pouppirt, Jr., Bartlesville, Okla., assignor to Phillips Petroleum Company, a corporation of Delaware
Filed Sept. 26, 1957, Ser. No. 686,337
9 Claims. (Cl. 239—381)

This invention relates to a method of spraying viscous liquids. In another aspect this invention relates to a nozzle which is suitable for dispersing viscous liquids. In one of its more specific aspects this invention relates to an improved two-fluid nozzle.

In the spray drying of polymers and other viscous materials it is often quite difficult to form discrete droplets of fluid from the spray nozzle as viscous solutions of polymer or the like tend to form into long strands or filaments. This is especially true when flashing of the solvent occurs immediately upon spraying. For ease of handling and conveying to subsequent processing steps it is highly desirable to form discrete particles of dried polymer and eliminate as much as possible the formation of these polymeric filaments.

According to my invention a method and novel spray nozzle are provided by which relatively viscous liquids can be dispersed into discrete droplets and the problem of filament formation as above described is substantially eliminated. This result is realized by using an interrupted gas stream to offset the flow of liquid issuing from the nozzle. The viscous liquid can be sprayed under relatively low pressure from a single orifice and the stream issuing therefrom is intercepted by a plurality of fluid streams converging upon the main liquid stream at substantially the same point. The flow of each of the several impinging fluid streams is interrupted individually and momentarily in a rapid sequence, thereby deflecting the main liquid stream in the direction of that fluid stream whose flow is interrupted.

A rotational flutter is thus imparted to the main liquid stream which results in its dispersal into discrete droplets. The nozzle which I have provided to effect such a spraying process comprises a two-fluid spray nozzle in which a plurality of secondary fluid discharge apertures are arranged to direct and impinge a plurality of fluid streams upon a main liquid stream, with means for sequentially closing each of said discharge apertures and thereby interrup the flow of the secondary fluid streams in rapid succession. In the preferred embodiment of my invention a nozzle is provided in which a gas stream drives a ball around a circular raceway having a plurality of ports leading to the secondary fluid discharge apertures. As the ball passes a gas port, it momentarily interrupts the gas flow and causes deflection of the main liquid stream. A further advantage is realized in this embodiment because the mass of the ball traveling in the raceway imparts a vibration to the nozzle causing further deflection of the liquid stream.

It is an object of my invention to provide a method of spraying viscous liquids in discrete droplets. It is another object of my invention to provide an improved spray nozzle which is suitable for use with viscous liquids, such as polymer solutions. It is a still further object of my invention to provide an improved two-fluid nozzle. Other objects, advantages and features of my invention will be apparent to those skilled in the art from the following description, claims and drawings in which FIGURE 1 is a cross section of the preferred nozzle of my invention;

FIGURE 2 is a sectional view of FIGURE 1 taken along line 2—2;

2

FIGURE 3 is an alternate embodiment of my nozzle in cross section;

FIGURE 4 is a sectional view of FIGURE 3 taken along line 4—4; and

FIGURE 5 shows in cross section still another embodiment of my improved two-fluid nozzle.

While it is preferred to incorporate the features of my invention in a single compact unit, the improved method can be practiced in a number of ways and need not be limited to the use of the preferred nozzles described. For example, a single spray nozzle can be arranged to issue a stream of viscous liquid with several gas jets arranged about the nozzle in such a manner as to impinge the gas streams upon the main liquid stream at substantially the same point. The flow of gas can be supplied separately to each of the gas jets and any suitable valving arrangement used by which the flow to each gas jet is temporarily interrupted. Any desirable sequence of interruption can be used but it is preferred that the gas streams be arranged symmetrically about the main liquid stream and the gas flow through each jet interrupted in either clockwise or counterclockwise successtion. It is also preferable that the gas streams intercept the main liquid stream at an acute angle, having a vector of flow in the same direction as the flow of the main liquid stream. In this way a rotational flutter is imparted to the main liquid stream which causes it to disperse into droplets.

The improved two-fluid nozzles which I have provided to effect liquid dispersion by interrupted flow of the secondary impinging gas streams can best be described by referring to the drawings. FIGURES 1 and 2 show the preferred nozzle which employs a rotating ball to interrupt the flow of the impinging gas streams.

Referring now to FIGURE 1, the preferred nozzle is shown in vertical cross section. The nozzle comprises a main body portion 10 which is preferably cylindrical, as shown in FIGURE 2. On the discharge end of the body portion 10 carrying threads **10*a*, head portion 11 is secured by retaining collar 12 having threads 12*a*. Running axially through both body and head portions is a tubular conduit 13 which carries the liquid being sprayed. Conduit 13 is secured to a plug 14 having threads 14*a* and a screwdriver slot 14*b* to facilitate its insertion into body portion 10. Conduit 13 fits snugly within an axial bore 15 in head portion 11 and terminates at flared opening 16 which is cut into head portion 11. The optimum angle formed by the walls of the flared opening 16** will vary with the particular solution being sprayed; however, an angle of approximately 110 degrees is generally satisfactory.

The gas stream enters the nozzle through channel 17 having threaded opening 18 in the wall of body portion 10. Channel 17 passes from opening 18 to the center of body portion 10 and thence axially to the discharge end of body portion 10. The discharge end of body portion 10 to which head portion 11 is fixed has an annular rabbet 19 cut in the face thereof. A core 20, shown in FIGURE 2, is thus formed between channel 17 and rabbet 19. Inset in rabbet 19 is a ring 21 having a concave inner face **21*a*. Ring 21 forms the raceway for steel ball 22 and is preferably made of a wear-resistant, surface-hardened steel. Arcuate grooves 23 are formed in core 20 communicating tangentially from channel 17 to rabbet 19. When head portion 11 is in place against the face of body portion 10, as shown in FIGURE 1, rabbet 19 becomes a closed annular chamber (also referred to as 19) and grooves 23 become closed turbinal passages by which a spiral flow is imparted to gases passing from channel 17 into chamber 19. In this way a force is imparted to ball 22 causing it to travel in a circular path about chamber 19 while seated against ring 21**. While 3 grooves or turbinal passages 23 are shown, 2 or more than 3 can also be used.

Head portion 11 is provided with symmetrically spaced discharge passages 24 which enter chamber 19 through ports 26. The number of passages 24 can vary considerably from 2 to 8 or more. Generally 3 or 4 passages are preferred for maximum flutter. Passages 24 form equal angles with the axis 25 of body portion 10 and discharge into flared opening 16 aligned so that the discharge streams converge and intercept the stream from conduit 13 at substantially a single point. The angle formed by passages 24 with the axis 25 of body portion 10 can vary depending upon the material being sprayed. Angles of about 30 to 45 degrees are typical although this angle can suitably be greater or less. As steel ball 22 travels in its path about chamber 19, it momentarily covers each discharge port 26 in rapid succession. In doing so, the ball interrupts the gas stream through a discharge passage 24 and causes an unbalanced force from those gas streams whose flow is not interrupted. Complete closure of each passage 24 is not necessary for satisfactory operation of the nozzle. It can be seen that for operability, the head and body portions can be considered as one piece with the suitable cavities formed therein. For ease of manufacture and assembly, however, the arrangement illustrated and described is preferred.

While the rotating steel ball is preferred because of the additional vibration which is imparted to the nozzle thereby, a number of means for valving discharge passages 24 can be provided. Alternative embodiments in this respect are shown in FIGURES 3, 4 and 5.

Figure 3:
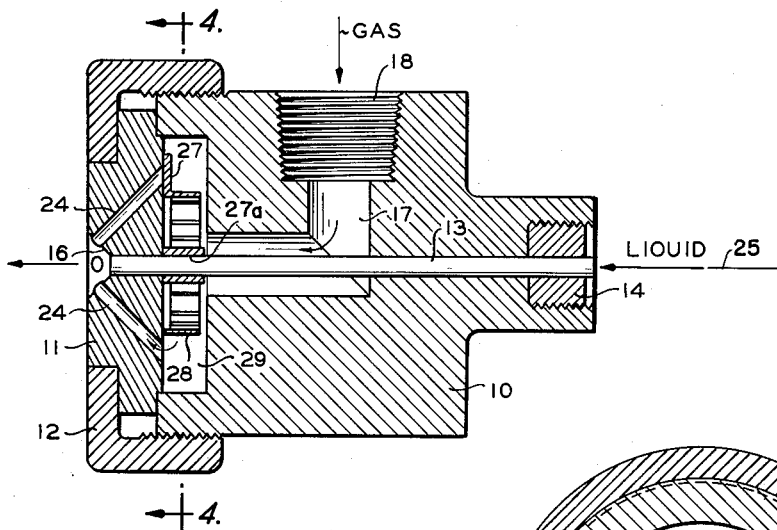
Figure 4:
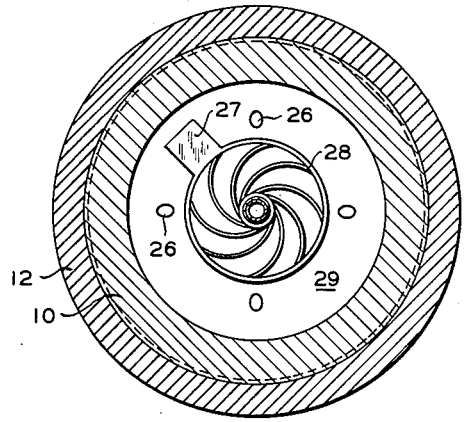
Figure 5:
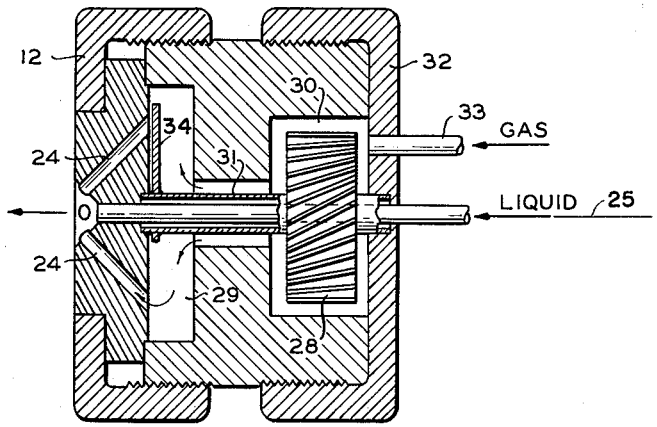

Referring to FIGURES 3 and 4, suitable valving means is provided by finger 27 which is pivotally mounted on pivot 27a about the axis 25 of body portion 10 and which has secured thereto turbine wheel 28, also mounted about the axis of body portion 10 employing conduit 13 as a spindle. Turbine wheel 28 is thus positioned in channel 17 and chamber 29, which is enlarged to eliminate core 20, so that gas passing through said channel and chamber drives the turbine wheel. This, in turn, rotates finger 27 which is positioned to pass over and close ports 26 in rapid succession. Alternatively, as shown in FIGURE 5, turbine wheel 28 can be positioned in a separate chamber 30 in body portion 10 and mounted on its own spindle 31 which is affixed to finger 34. A second retaining collar 32 is provided having gas inlet 33. Gas entering through inlet 33 into chamber 30 drives turbine wheel 28 which, in turn, rotates finger 34 as described in the previous embodiment.

While the method and apparatus of my invention is of particular advantage for dispersing viscous liquids, it can also be used for various other purposes where an efficient spraying is desired, such as in fire fighting equipment, crop sprayers, and the like. It can also be used in mixing fluids since it provides both immediate mixing of the fluids passing through the nozzle, as well as agitation of a body of fluid into which it can be immersed.

As will be evident to those skilled in the art, various modifications of the invention can be made and followed in the light of the foregoing disclosure and discussion without departing from the spirit and the scope thereof.

I claim:

1. In an external mixing two-fluid spray nozzle having a body member containing a main fluid channel and discharge aperture and a plurality of secondary fluid channels and discharge apertures arranged about said main fluid aperture in such a manner as to cause a plurality of secondary fluid streams to impinge upon the main fluid stream at substantially the same point, the improvement which comprises valving means in said body member disposed in relation to said secondary fluid channels for sequentially and momentarily interrupting the flow of said secondary fluid streams in rapid succession, said valving means being actuated by the passage of fluid through said secondary fluid channels.

2. A spray nozzle suitable for dispersing viscous liquids comprising a body portion having a channel passing therethrough, said channel having a single inlet and terminating in a plurality of smaller passages disposed about a central axis and arranged to converge fluid streams issuing therefrom at a single point, a main conduit passing through said body portion and terminating in an orifice positioned on said axis and aligned to issue a main fluid stream through said point of convergence, and valve means within said body portion disposed in relation to said channel for sequentially and momentarily interrupting the flow of fluid through said smaller passages in rapid succession, said valve means being actuated by the passage of fluid through said channel.

3. A spray nozzle suitable for dispersing viscous liquids comprising a body member having a face portion and defining cavities including a manifold chamber within said body portion, a channel leading from outside said body portion to said chamber and a plurality of passages leading from said chamber and terminating individually in apertures on said face portion, said passages being arranged symmetrically about an axis perpendicular to said face portion and passing through said body member, and said passages being inclined equally toward said axis so as to converge streams issuing therefrom toward a single point external said body portion; closure means within said chamber disposed to rotate about said axis and sequentially block communication between said chamber and each of said passages; means associated with said closure means to rotate same by the passage of fluid through said channel and member; and a main conduit passing through said body portion, terminating in an outlet on said axis and disposed to eject a liquid stream along said axis toward said point of convergence.

4. A spray nozzle according to claim 3 wherein said closure means comprises a ball and said means to rotate same by the passage of fluid through said channel and chamber comprises a plurality of turbinal passages through which fluid must pass from said channel to said chamber.

5. A spray nozzle according to claim 3 wherein said closure means comprises a finger pivotally mounted about said axis and said means to rotate same by the passage of fluid through said channel and chamber comprises a turbine wheel fixed to said finger, mounted on said axis and positioned to receive and be propelled by fluid passing through said channel and chamber.

6. A spray nozzle suitable for dispersing viscous liquids comprising a body member having a face portion and defining cavities including an annular manifold chamber within said body portion, a channel leading from outside said body portion and terminating with a circular cross section within the core of said annular chamber, a plurality of first arcuate passages tangentially communicating said channel and said chamber so that fluid passing from said channel to said chamber is discharged spirally from said first passages, and a plurality of second passages leading from said chamber and terminating individually in apertures on said face portion, said second passages being arranged symmetrically about an axis perpendicular to said face portion and passing through said body member, and said second passages being inclined equally toward said axis so as to converge fluid streams issuing therefrom toward a single point external said body portion; a spherical member freely positioned within said annular chamber and of sufficient size to substantially block the passage of fluid about said chamber and from said chamber into any one of said second passages so that said spherical member is caused to travel about said chamber by the spiral flow of fluid thereinto and thereby momentarily seal the opening of each of said second passages; and a main conduit passing through said body portion, terminating in an outlet adjacent said apertures of said second passages and aligned to issue a stream of liquid along said axis toward said point of convergence.

7. A spray nozzle suitable for dispersing viscous liquids comprising a body member having a face portion, a flat head portion secured to said body member with one face of said head portion against said face portion, a tubular conduit passing through said body member and head portion and terminating in a flared opening in the outer face of said head portion, said head portion and body member defining at their interface an annular chamber concentrically positioned about said conduit, and a ball freely contained within said annular chamber, said body member defining therewithin a gas inlet channel with a plurality of arcuate passages providing substantially tangential communication between said channel and the inner wall of said chamber, said passages constructed and arranged to impart a spiral motion to gas flowing therethrough and thereby cause said ball to travel about said chamber in an annular path, and said head portion having a plurality of discharge passages communicating said chamber and said flared opening, said discharge passages having discharge openings into said chamber in the path of said ball so that said ball interrupts gas flow through each of said discharge passages as it passes over said discharge openings and said discharge passages being aligned to dicharge convergent streams impinging upon a stream issuing from said conduit.

8. A spray nozzle suitable for dispersing viscous liquids comprising a cylindrical body portion having a tubular channel passing therethrough from a threaded inlet in the wall of said body portion inwardly toward the center thereof and continuing axially to an outlet in one end of said body portion, said body portion having an annular rabbet in said end thereof concentrically positioned about said outlet and forming a core between said channel and said rabbet, said core containing three symmetrically spaced arcuate grooves passing tangentially from said channel to said rabbet; a ring member positioned inside and against the outer wall of said annular rabbet, said ring member having a concave surface on its face toward the axis of said body portion and being constructed of a highly wear resistant material; a solid ball freely contained within said rabbet and fitting smoothly against said concave surface of said ring member, said ball being rotatable about said annular rabbet against said ring member by the force of gas flowing through said channel and into said rabbet with a spiral flow imparted by the curvature and arrangement of said grooves in said core; a disk shaped head portion fitting against said end of said body portion, axially aligned therewith, and closing said annular rabbet and arcuate grooves forming an annular chamber and arcuate passages therefrom respectively, said head portion having an axial bore passing therethrough and terminating in a flared opening in the outer face thereof and said head portion containing four symmetrically positioned straight passages communicating said chamber and said flared opening, said straight passages forming equal angles with the axis of symmetry of said head portion and entering said chamber in the path of said ball so that said ball when directly over one of said straight passages substantially seals same from said chamber; a threaded collar securing said head portion to said body portion; and a main tubular conduit passing axially through said body portion, fitting snugly in said bore in said head portion and terminating at the beginning of said flared opening, said main conduit and said straight passages being positioned to issue converging streams toward substantially the same point.

9. In an external mixing two-fluid spray nozzle having a body member containing a main fluid channel and discharge aperture and a plurality of secondary fluid channels and discharge apertures arranged about said main fluid aperture in such a manner as to cause a plurality of secondary fluid streams to impinge upon the main fluid stream at substantially the same point, the improvement which comprises means for sequentially and momentarily interrupting the flow of said secondary fluid streams in rapid succession, said means being activated by the passage of the fluid entering the secondary fluid channels.

References Cited in the file of this patent

UNITED STATES PATENTS

| | | |
|---|---|---|
| 1,501,449 | Hall | July 15, 1924 |
| 1,608,833 | Birkenmaier | Nov. 30, 1926 |
| 1,782,309 | Ludwig | Nov. 18, 1930 |
| 2,014,942 | Lemoine | Sept. 17, 1935 |
| 2,086,515 | Evans | July 6, 1937 |
| 2,139,133 | Paasche | Dec. 6, 1938 |
| 2,177,851 | Wallace | Oct. 31, 1939 |
| 2,556,517 | Broussard | June 12, 1951 |
| 2,738,231 | Kurtz | Mar. 13, 1956 |
| 2,770,835 | Williams | Nov. 20, 1956 |
| 2,878,066 | Erwin | Mar. 17, 1959 |

FOREIGN PATENTS

| | | |
|---|---|---|
| 106,095 | Great Britain | Dec. 20, 1917 |
| 731,918 | Great Britain | June 6, 1932 |